United States Patent [19]
Bergstrom

[11] 3,896,977
[45] July 29, 1975

[54] LIQUID DISPENSER

[76] Inventor: Thomas G. Bergstrom, 1312 Appeal Ave., Elmont, N.Y. 11003

[22] Filed: Apr. 2, 1973

[21] Appl. No.: 346,967

Related U.S. Application Data

[63] Continuation-in-part of Ser. No. 243,691, April 13, 1972, abandoned.

[52] U.S. Cl. .............................................. 222/353
[51] Int. Cl. .......................................... G01f 11/10
[58] Field of Search .......... 222/56, 129.3, 173, 353, 222/161, 166, 457; 141/351, 352; 220/22; 280/5 D

[56] References Cited
UNITED STATES PATENTS

| | | | |
|---|---|---|---|
| 1,701,490 | 2/1929 | Carter | 220/22 |
| 1,949,387 | 2/1934 | Hardcastle | 222/181 |
| 3,147,891 | 9/1964 | Fielitz | 222/166 |
| 3,311,270 | 3/1967 | Juergens | 222/181 |
| 3,329,315 | 7/1967 | Wilcox | 222/166 X |
| 3,499,578 | 3/1970 | O'Neal | 222/161 X |
| 3,653,531 | 4/1972 | Zurmuehlen | 220/22 X |

Primary Examiner—Stanley H. Tollberg
Assistant Examiner—John P. Shannon

[57] ABSTRACT

A completely moldable unit having a dispensing trough that includes a control compartment to effect a liquid seal with a conduit extending to the interior of an air-tight liquid supply container. In one position of the tiltable trough, a predetermined quantity of liquid is permitted to flow until the liquid seal is effected; thereafter, during discharge from the trough while in a second position, the seal is maintained due to the liquid level in the control compartment.

15 Claims, 26 Drawing Figures

PATENTED JUL 29 1975

3,896,977

SHEET 1

PATENTED JUL 29 1975 3,896,977
SHEET 2

PATENTED JUL 29 1975

3,896,977

SHEET 5

LIQUID DISPENSER

CROSS-REFERENCE TO RELATED APPLICATION

This is a continuation-in-part of co-pending application Ser. No. 243,691, filed Apr. 13, 1972, now abandoned.

BACKGROUND OF THE INVENTION

1. Field of the Invention

This invention relates to liquid dispensers and, more particularly, to liquid dispensers wherein predetermined quantities of liquid are extracted from air-tight containers.

2. Description of the Prior Art

There is a wide variety of uses for liquid dispensers that can be actuated to automatically provide a predetermined quantity of liquid. These uses range from the delivery of small quantities of liquid for medicinial purposes, intermediate quantities for alcoholic beverages, and larger quantities for general beverage consumption. There is a need for accurate metering in liquid dispensers. This is particularly true where small quantities are extracted, however accuracy may also be important with larger quantities; depending upon the cost and nature of the liquid being handled.

The prior art arrangement of particular interest as background for the present invention involves a structure wherein an open-ended air-tight liquid container is kept inverted with its open end submerged in liquid in a collection cup. There is equilibrium between the air pressure in the container and the ambient air pressure on the liquid in the cup and therefore further liquid will now flow into the cup. In effect, there is a liquid seal created as long as the open-end is submerged. In 1917, Doering, et al., received U.S. Pat. No. 1,225,418 for a device wherein an inverted bottle containing liquid was mounted with its open neck portion extending into a tiltable cup. In 1934, Hardcastle received U.S. Pat. No. 1,949,387 disclosing a similar structure, but including a discharge tube and sealing element to insure accurate metering. In 1940, Stringfellow received U.S. Pat. No. 2,208,862 which disclosed a special cap for attachment to bottles. This cap included several separate compartments to measure liquid prior to dispensing and for effecting the liquid seal during discharge.

SUMMARY OF THE INVENTION

The present invention is an improvement over prior liquid dispensing devices. In accordance with the structure and method described in detail hereinafter, the present invention provides highly accurate measured liquid dispensing without valves or other control devices and also assures minimum liquid residue following dispensing.

An object of the invention is to provide an improved measured liquid dispenser wherein liquid flow is controlled by imposition of a liquid seal automatically effected by the level of the liquid when a determined volume has been extracted from a supply container.

Another object of the invention is to provide an improved dispenser which enables one to extract liquid from a supply container up to a predetermined maximum quantity at any one time.

Another object of the invention is to provide an improved liquid dispenser which is substantially drip-proof.

Another object of the invention is to provide an improved liquid dispenser that is substantially splash-proof.

Another object of the invention is to provide an improved liquid dispenser yielding extreme accuracy of volume dispensed, with minimal manufacturing cost.

Another object of the invention is to provide an improved liquid dispenser that can be assembled without tools from individually molded elements.

Among the features of this invention, are: a unique double chambered trough that permits the damming of liquid in a small control chamber while discharging the premeasured quantity from the larger discharge chamber; a means to assure drip-proof extraction of liquid from the trough; a light trap arrangement to observe the amount of liquid present in the supply container; and a construction that employs a minimum of simply molded elements, snap-fitted together.

In accordance with one aspect of the invention, there is provided a method of dispensing predetermined quantities of liquid from a substantially air-tight container, comprising mounting a trough below the container, inserting a conduit between the interior of the container and the trough to permit fluid flow, and damming the area within the trough in the vicinity of the conduit such that the liquid level in the dammed area is above the opening in the conduit when the trough is in a first position. Thereafter, tilting the trough to a second position lowers the liquid level within the dammed area below the opening in the conduit and permits overflow into the remaining area of the trough. The liquid is discharged from the remaining area of the trough while it is in the first position.

In accordance with another aspect of the invention, there is provided a liquid dispenser comprising a plurality of moldable elements, each having draft angles extending in a single direction only. A first element includes a compartment for receiving at least one liquid container in an inverted position. A second element is pivotally suspended below the compartment and is adapted to receive liquid from the container, the second element being suspended by bearing projections seated in apertures in the first element.

In accordance with a further aspect of the invention, there is provided a dispenser comprising an independent trough mounted below a liquid container for tilting about a horizontal axis, the trough normally residing at a predetermined angle; conduit means adapted to communicate with the inside of the container below the liquid level and having an open end extending into the trough, a walled area within the trough surrounding the region into which the conduit means extends; and a dispensing aperture in the trough located above the lowermost internal portion thereof, when it resides at said predetermined angle.

In accordance with yet another aspect of the invention, there is provided in a liquid dispenser, a storage chamber having a substantially flat bottom surface in contact with the liquid. An aperture pierces this bottom surface and the bottom surface is raised in the area directly surrounding the aperture in order to provide a drip-proof dispensing port from the storage chamber.

In accordance with still another aspect of the invention, there is provided a trough for dispensing liquid that is supplied thereto via a conduit. This trough includes a storage chamber having a substantially flat bottom surface in contact with the liquid and an aperture piercing the bottom surface near one edge of the chamber. An upward projection from the bottom surface extends traversely across the chamber and substantially separates the area adjacent to the aperture from the remainder of the bottom surface. Cover means is provided for this storage chamber which has a downward projection extending transversely across the chamber substantially in parallel with the upward projection. This downward projection is offset toward the aperture and extends below the upper edge of the upward projection; whereby in the event of agitation the liquid within the trough is prevented from splashing forward and through the aperture. On the other hand, during normal operation there will be controlled flow of liquid from the trough through the aperture.

The numerous objects and unique features of the invention will be more clearly understood and appreciated from the following detailed description that is made in conjunction with the drawings.

DESCRIPTION OF THE PREFERRED EMBODIMENTS

Figure 1:
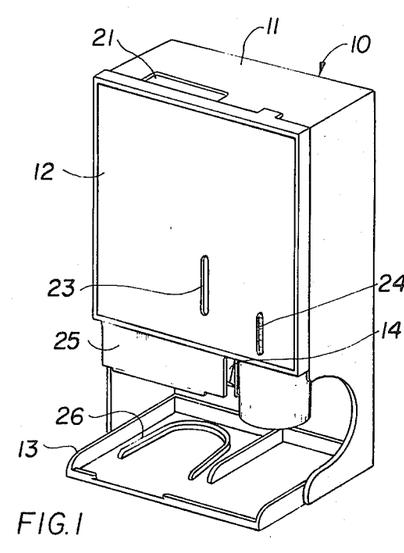
FIG. 1 is a perspective view of a liquid dispenser embodying the features of the present invention.

The embodiment of the invention shown in FIG. 1, comprises a unit 10 having a basic body element 11, front cover element 12, base element 13, and liquid dispensing trough 14. These components are arranged for cooperative snap-assembly without the use of external fastening means. By utilizing plastic materials having inherent resiliency, this cooperative interaction is greatly enhanced. The structure is also specifically designed for modling processes and all draft angles may run in the same direction. The development of expensive molds for the forming of any of the individual elements, is not necessary.

Figure 2:
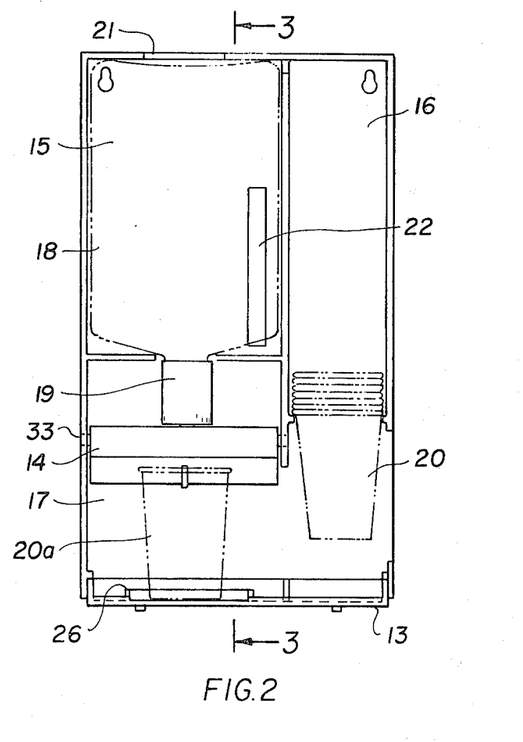
FIG. 2 is a front elevation view of the embodiment shown in FIG. 1 with the front cover removed.

The major body element 11 is seen more clearly in the elevation view of FIG. 2, wherein the front cover 12 is removed. There are three basic compartment sections in the main element. These include the container compartment 15, the cup compartment 16, and the dispensing compartment 17. Container compartment 15 is an essentially enclosed area having an opening at the bottom which will permit liquid to be dispensed from a container to the lower area. A bottle 18 with a cap 19, is shown in phantom outline with the cap projecting through an opening at the lower portion of the container compartment. The cup holding compartment 16 may run vertically along the entire length of the unit and may conveniently be dimensioned to secure paper cups, plastic cups, or the like, in any well known fashion. Projections from the walls at the lower portion of the chamber 16 assist in holding a plurality of cups in position while also permitting the release of individual cups as a result of downward pressure applied by a prospective user. A plurality of cups 20 are illustrated in phantom outline. The liquid dispensing chamber 17 houses the dispensing trough 14 and also the unique cap and conduit 19, 30 which cooperates therewith. Still further, it provides space for the placement of a cup 20A which actuates the trough and receives the liquid that is dispensed.

The liquid level indicator of the invention is clearly visible in conjunction with FIGS. 1 and 2. An aperture 21 is provided at the top of the body element 11 and a reflective strip or surface 22 is provided on the back. When a liquid having transparent or translucent properties is present in a translucent supply container 18, light entering the aperture 21 is transmitted through the liquid onto reflective surface 22 and is visible through aperture 23 in the front cover. It has been found that when the liquid has a color, the effect of the indication is aperture 23 is very similar to that of a thermometer.

It will also be noted that front cover 12 includes an aperture 24 disposed at the lower portion of the cup dispensing compartment. This slotted aperture makes it possible to determine the number of cups remaining within the concealed compartment. A skirt portion 25 of cover 12 shields and protects the working elements of the liquid dispenser.

Figure 3:
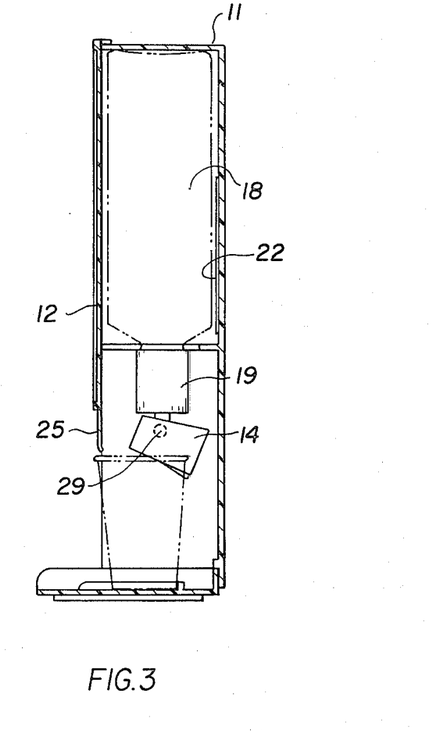
FIG. 3 is a vertical cross-sectional view taken along lines 3—3 of FIG. 2.

Base or pedestal element 13 acts to provide a stable mounting platform for the entire unit in the event that it stands upon a table or shelf. It also provides a clean and cleanable surface for holding cups during liquid extraction. A cup stop projection 26 limits travel of the cup in the direction of the back and assures proper side positioning under the discharge aperture of the trough 14. Of course, although element 13 may be used to stand the unit on a horizontal surface, the embodiment shown in FIGS. 1, 2 and 3 may also be hung upon a wall. The unit is light and compact and its mounting presents little difficulty.

Figure 4:
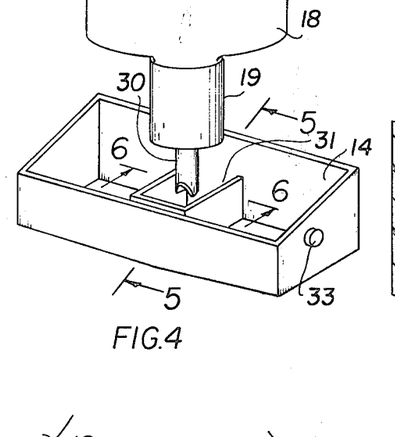
FIG. 4 is an enlarged perspective view of the dispensing trough and fluid discharge element used in the FIG. 1 embodiment of the invention.

FIGS. 4 and 5A–5D illustrate the structure and method of effecting the liquid seal principle with the present invention. FIG. 4 is an enlarged perspective view of the liquid dispensing and control trough 14 positioned below the cap 19 of a closed liquid container 18. Cap 19 may conveniently be threaded upon the liquid container and the container itself may take any form. It is contemplated that container 18 may include commercially available bottles containing various liquids to be periodically dispensed. For example, mouth washes and medicines are often available in such bottles. A conduit in the form of nozzle or stem 30, having a diameter somewhat reduced from that of the cap, extends downwardly into trough 14. In a particular embodiment, extended conduit portion 30 had an internal diameter of between one-quarter and three-eights of an inch.

Trough 14 is divided into two compartments. The smaller compartment 31, surrounds conduit 30 and the walls of this smaller compartment extend upwarwd beyond the lower opening of conduit 30. These walls are lower than those of the trough 14 and permit overflow of liquid into the outer compartment during each filling operation. Of course, where desired, this overflow condition might also be accomplished even if the inner walls were higher, by the selective use of holes or slots in the walls.

Figure 5A:
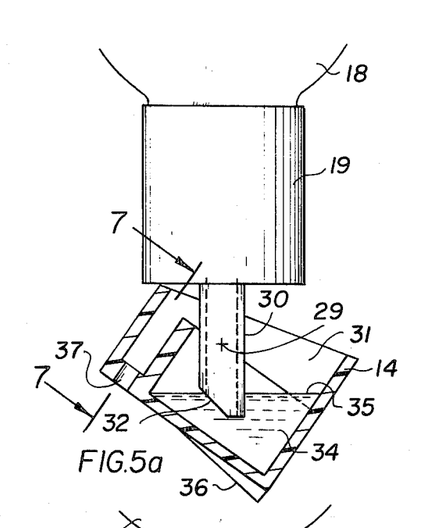
FIGS. 5A through 5D are cross-sectioned schematic illustrations taken along line 5—5 in FIG. 4, showing a normal sequence of operation involved in the filling and dispensing of liquid accordance to the method and structure of the invention.
Figure 8:
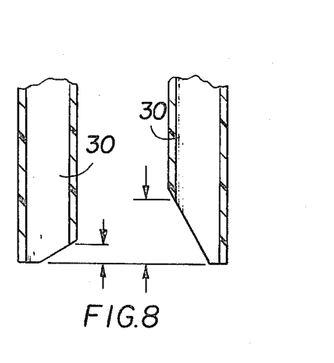
FIG. 8 is a schematic cross-sectional view of two liquid dispensing nozzles of the type useful in conjunction with the invention.

As clearly illustated in enlarged views of FIGS. 5a throuogh 5d, the lower end of conduit 30 terminates advantageously in a beveled end 32. Utilization of this bevel improves the ability of the unit to discharge liquid at the appropriate time and also permits accurate metering of the liquid. FIG. 8 shows that the degree of bevel may vary. In the schematic on the left side of FIG. 8, the top of conduit 30 is quite blunt and the amount of the angle relatively slight. By contrast, in the schematic on the right side of FIG. 8, the amount of angularity is quite steep. It has been discovered that if too small an angle is used there is a tendency with liquids having high surface tension to lock in a closed condition even when the conduit tip is exposed to the surrounding air. Apparently this condition depends both upon the surface tension of the liquid being handled and the diameter of conduit 30. By providing a more steeply inclined tip, it is possible to overcome this possibility of surface tension lock-up. In addition, the steeper angle provides a sharper cut-off or control point, for control of the amount of liquid dispensed into the trough prior to sealing.

Operation of the liquid seal control principle as employed by this invention, will be explained in conjunction with the four schematic illustrations of FIG. 5.

FIG. 5a illustrates the unit in its quiescent position. In this position trough 14 is tilted in a clockwise direction about a pivot axis 29. This pivot axis may be achieved by nesting bearing projections 33, formed as an integral part of the trough, in cooperating slots or apertures in the main frame 11. With the assembly in this position, liquid 34 will flow into the trough until the opening of conduit 30 is submerged. Since container 18 is a closed container, air will not be able to enter the container via conduit 30 when the liquid level 35 has effected the seal. Accordingly, the conditions have stabilized and one is assured that the amount of liquid 34 in the trough at the time of sealing will always be constant because the seal is automatically effected.

When it is desired to vary the predetermined quantity discharged into trough 14, stops are provided to limit the rotation of the trough in its quiescent position. Thus, if the trough were rotated still further in a clockwise direction, more liquid will be drained into it before cutoff, than in the situation where less clockwise rotation is permitted.

Figure 5B:
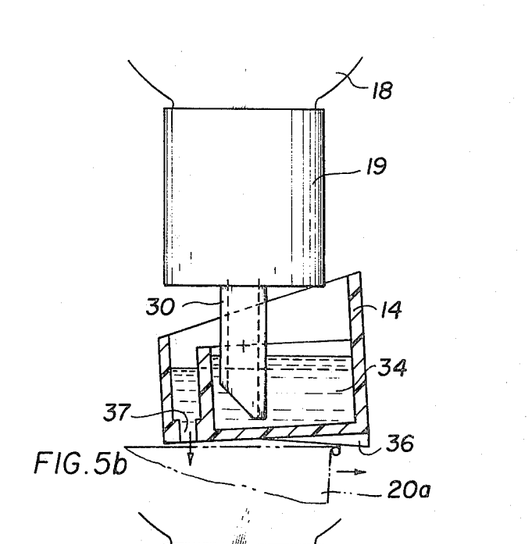

To empty the liquid from trough 14 into a cup or similar container, such a cup 20a is positioned under the trough while simultaneously causing the trough 14 to pivot in a counter clockwise direction. This is illustrated in FIG. 5b. The amount of counter clockwise rotation need merely be enough to insure that the front edge of trough 14 is below the rear edge. This may be conveniently accomplished by the inclusion of an inclined element 36 which will be engaged by the lip of a cup 20a as it is pushed toward the right in the figure. On the other hand, a depending extension may be provided from the rear of trough 14 for contact with the body of a cup. With such an element, the edge of the cup need not contact the trough. The lower front portion of trough 14 includes an aperture 37, which will be described in more detail hereinafter, and upon counter clockwise tilting of the trough, all liquid in the outer compartment is discharged into cup 20a.

Figure 5C:
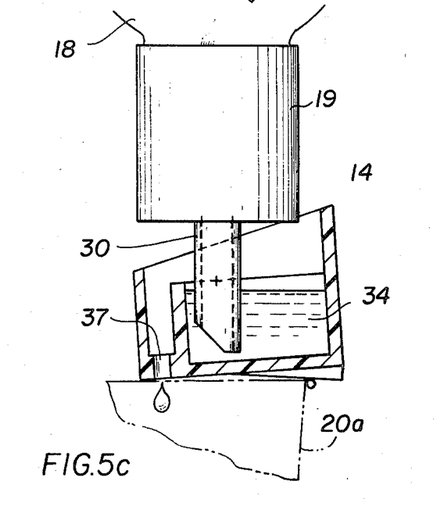

As illustrated in FIG. 5c, during the counter clockwise tilting of trough 14, the liquid present within control compartment 31 maintains the initial liquid seal and prevents further discharge of liquid from the supply container 18. The amount of liquid within the compartment 31 is minimal due to its narrow shape.

Figure 5D:
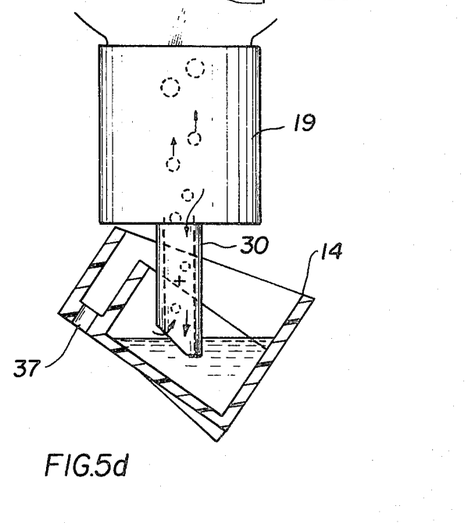

When all liquid has been discharged from the main trough 14 into cup 20a, the cup may be withdrawn. This withdrawal will immediately result in clockwise tilting of trough 14 because of the location of the pivot axis 29. FIG. 5d illustrates the refilling portion of the operating cycle that occurs as trough 14 resumes its static position. As soon as the liquid level in the control compartment 31 drops below the opening of conduit 30, air is permitted to enter container 18 and the liquid pours into the trough 14. Liquid will continue to flow from the container 18 until once again the liquid seal is established as described above. While considering FIG. 5d, it may be noted that it is desirable to design compartment 31 to insure a liquid level when the trough first returns to its quiescent position, that makes contact with conduit 30.

Figure 6:
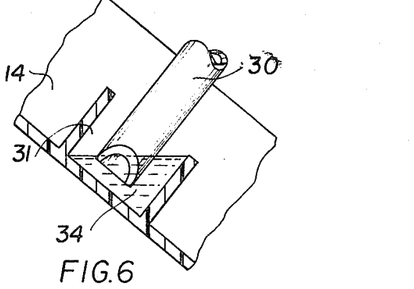
FIG. 6 is an illustrative sketch showing portions of a dispensing nozzle and the control trough in a typical rotated position encountered following initial loading of a dispenser.

When the invention is embodied in a portable unit, the spill-proof aspects of this method of sealing are useful and may be appreciated by consideration of FIG. 6. FIG. 6 is a partial diagramic cross-section taken along line 6—6 of FIG. 4 and illustrates the unit rotated clockwise from its position of FIG. 1, by approximately 80°. To initially insert a container 18 into the dispenser, it is desirable to turn the entire unit upside down. Container 18 can then be inserted into compartment 15 without danger of spillage. The unit is then turned upright. FIG. 6 is intended to illustrate the position of the unit as it is being returned to the upright position. Until the unit has been rotated at least 90° there is no danger of spillage from the container 18. As soon as this angle is exceded however, liquid will begin to flow from conduit 30. Since the control compartment 31 entraps this liquid, as soon as the unit begins rotating, the liquid seal is quickly effected and there is no further liquid flow.

Figure 7:
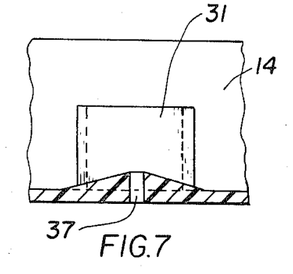
FIG. 7 is a partial cross-sectional view of the trough taken along lines 7—7 of FIG. 5A.

FIG. 7 shows how the dispenser of this invention may be rendered drip-proof. This figure is a partial cross-section through the front of trough 14 along the line 7—7 shown in FIG. 5a. Aperture 37 is clearly depicted as piercing the base of trough 14 and emerging on the internal surface at the top of an inclined area. It will be understood that as soon as the liquid empties from trough 14, there will be some residue in aperture 37. As a result of the incline to the aperture, the major portion of this residue liquid will tend to flow back into the trough. As a result of capillary attraction, any liquid remaining near the aperture will accordingly be pulled back down by this residue into the trough rather than being left to drip through the aperture. The particular shape of the inclined portion may vary. In one embodiment, it may be simply an inclined plane; however, a conical configuration has been found equally operative.

Figure 9:
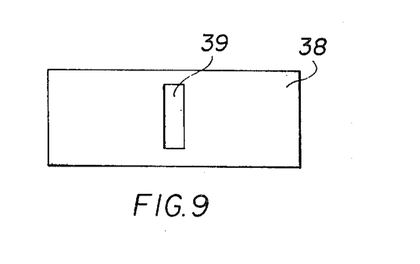
FIG. 9 is a top view of a cover for use on the trough of this invention.

A cover member 38 for the trough of this embodiment, is shown in FIG. 9. This cover member may advantageously be designed to snap into position over the opening of trough 14. An elongated slot 39 is provided at the center of cover 36 to accommodate nozzle 30. In certain circumstances it may also be desired to include a flexible skirt surrounding nozzle 30 and generally embracing trough 14.

FIGS. 10 through 13 illustrate the application of the principles and features of this invention in a second embodiment. The unit 100 includes a basic housing portion 101, a beverage storage compartment 102, a beverage dispensing trough 103, and the cover element 104. A removable face plate 105 is provided in order to conceal the operating trough 103 from the user and a cup storage compartment may be provided at the rear of the unit as illustrated by the cups 107 seated within storage compartment 106.

Trough 103 functions in the same manner described relative to the first embodiment of the invention. As seen most clearly in FIGS. 12 and 13, the trough is pivoted upon bearings 111 and 112 which are in apertures on opposite sides of the housing. It is positioned so that the nozzle or conduit 117 which dispenses fluid from container 102, projects into the control trough. In order to extract liquid a cup is positioned under the trough forcing it upward and in a counter clockwise direction, as viewed in FIG. 13. A cup stop 109 is provided in order to assure proper cup positioning when the unit is provided with the base element 108.

It will be appreciated that the housing and elements illustrated in FIGS. 10 through 13 are also specifically designed for cheap molding and convenient snap assembly. Specific details are not shown in this particular embodiment however.

Figures 10, 11:
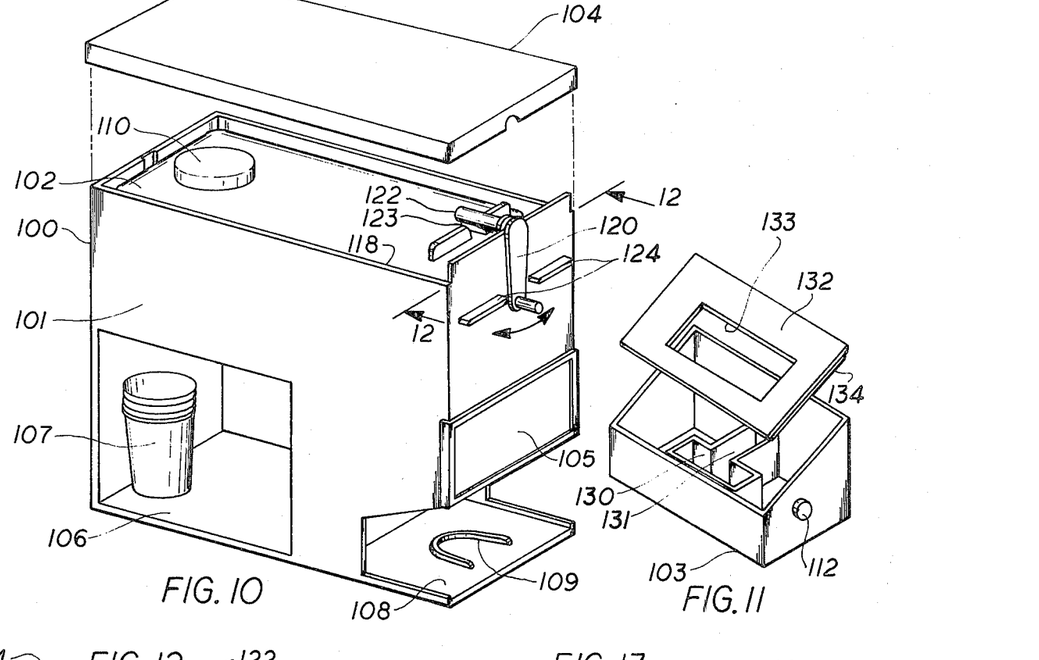
FIG. 10 is a partially exploded perpsective view of a second liquid dispenser embodying the features of the invention.
FIG. 11 is a partially exploded view of a dispensing trough used in conjunction with the embodiment of FIG. 10 and having the cover thereof removed.
Figures 12, 13:
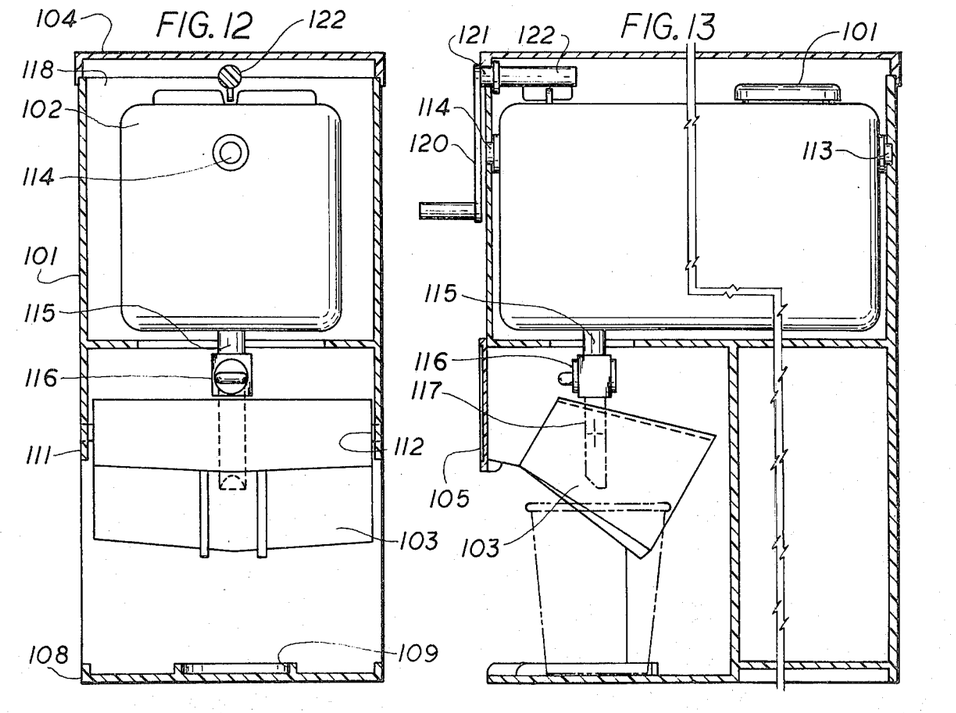
FIG. 12 is a cross-sectional view in elevation taken along the plane defined by lines 12—12 in FIG. 10.
FIG. 13 is a side view of the embodiment shown in FIG. 10, with one side removed.

The second embodiment of the invention is designed for storage and dispensing of larger quantities of fluid than the first embodiment, and accordingly the storage chamber 102 is also somewhat larger. This chamber is provided with bearings 113, 114 on each end which fit within apertures on the front and back walls of the housing 101. This arrangement permits rocking of the compartment 102 in order to agitate the contents in the event the stored liquids have a tendency to settle out. The interior of compartment 102 may also be provided with a transverse vane in order to assist in agitating when the compartment is rocked.

For manual agitation of compartment 102, a lever 121 may be provided on the face of the housing. Lever 121 is pivoted within a channel 121 in apertures provided at the upper portion of the housing 101 and the lower portion of cover 104. A projection 122 from this lever, is in proximity to projecting elements 118 on the top of the container 102. Thus, partial rotation of lever 120 effects engagement of the vane 123 with elements 118 and rocks the container. It has been found that a very limited arcuate movement is required in order to achieve thorough mixing of the liquid contents.

This second beverage dispenser also illustrates the optional employment of a valve 116 within the conduit from container 102 to trough 103. In some applications, it may be desired to close this conduit and avoid fluid flow into trough 103. For example, this condition may be desired during prolonged periods of non-use. The specific form of valve 116 is not important; however, simplicity is to be preferred and in this illustration, an inline valve has been used which will close by 90° rotation of the extending control member. Liquid may be inserted into the container 102 via the port sealed by closing cap 110.

FIGS. 14 through 17 illustrate a third dispenser containing embodiments of the invention, featuring a housing that will permit dispensing of the liquid at either side.

Figure 14:
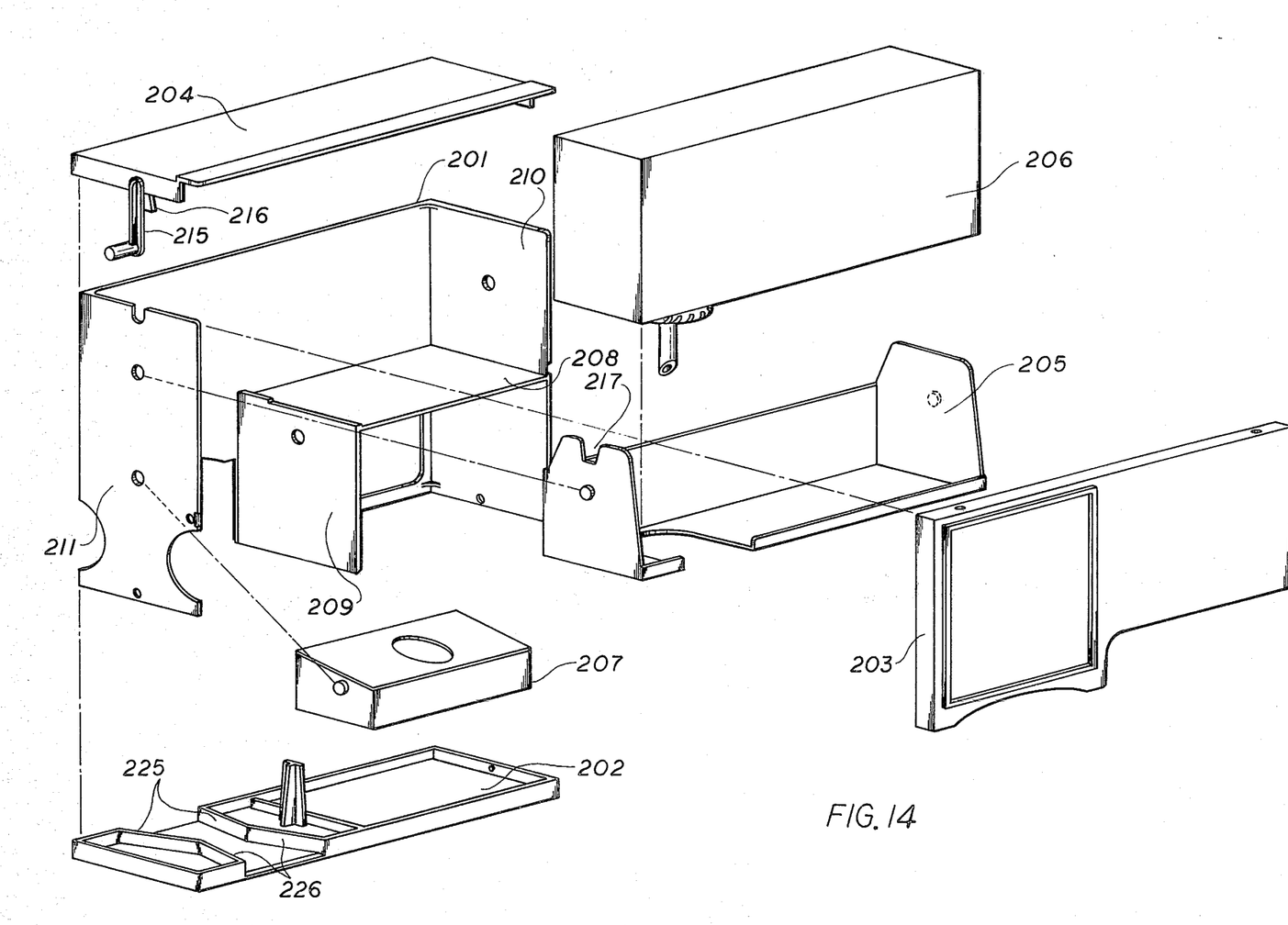
FIG. 14 is an exploded perspective view of a third liquid dispenser embodying the features of the present invention.
Figure 15:
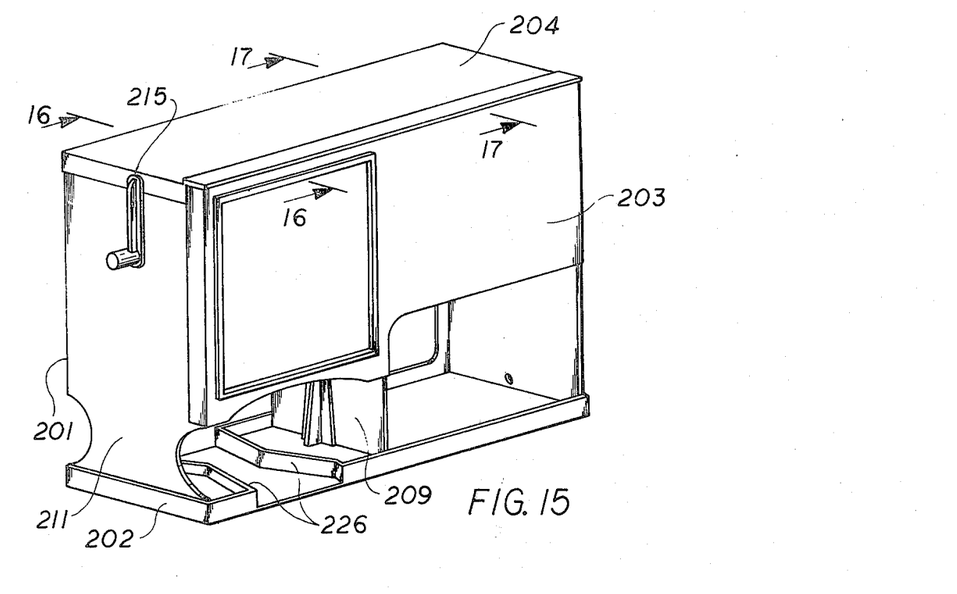
FIG. 15 is a perspective view of the third embodiment of the invention in an assembled form.

From the perspective view of FIG. 15, it will be seen that the unit includes features and components similar to those already described in connection with the second embodiment. For example, there is a storage compartment at the rear for cups or the like. The dispensing portion of the unit appears toward the front and will be seen to be symmetrically disposed on either side. The manner in which the trough is mounted and the components assembled, may be more clearly understood from a consideration of the exploded view of FIG. 14.

The third dispenser also exhibits the design features which permit complete molding of the various individual parts in similar molds. Furthermore, each element is snap assembled to the adjacent cooperating elements in order to facilitate ease of assembly. This dispenser comprises a basic housing portion 201, base 202, side cover 203, top cover 204, container carriage 205, container 206, and dispensing trough 207. Housing 201 is provided with vertical walls 210, 211 at front and rear which include apertures for engaging bearings on the carriage 205. This carriage is therefore pivotally mounted with the housing. A lever 215 is assembled to top 204 and has a depending internal projection 216 adapted to engage in a slot 217 of carriage 205. When assembled, slight arcuate movement of lever 215 will result in rocking of carriage 205 about the axis created by the bearing supports. Beverage container 206 nests within the walls of carriage 205 with the dispensing conduit 221 extending downward through aperture 220.

The cup storage compartment at the rear of the third dispenser is formed by a short vertical wall 209 and horizontal partition 208, each of which are affixed to housing 201. A bearing aperture in wall 209 is aligned with a similar aperture in front wall 211 of the housing and provides the axial support required for the bearings of dispensing trough 207.

Figure 16:
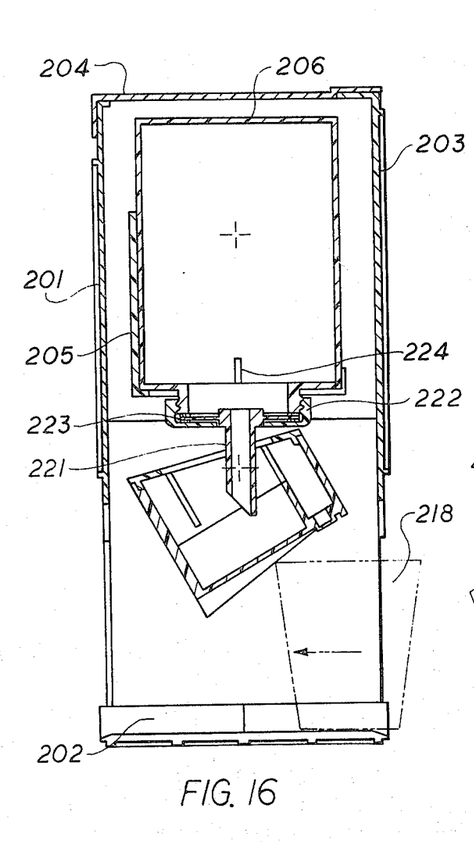
FIG. 16 is a cross-sectional view taken along lines 16-16 of FIG. 15.
Figure 17:
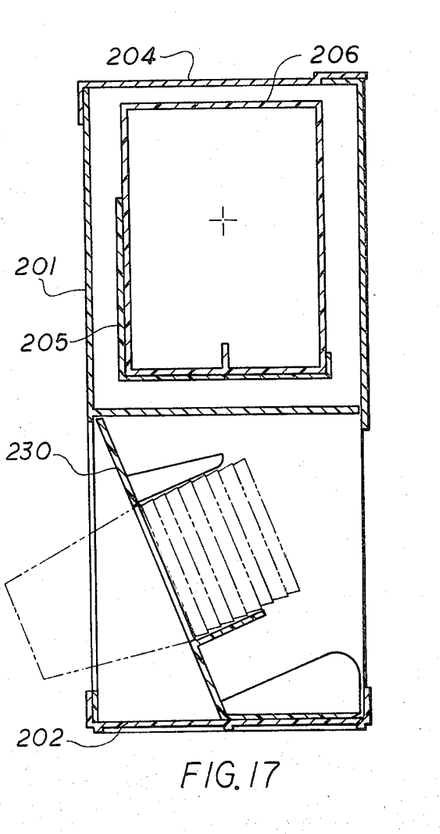
FIG. 17 is a cross-sectional view taken along lines 17—17 of FIG. 15 and showing the positioning of a cup holding unit within a storage compartment of the third embodiment.

The exploded view of FIG. 14 offers a good illustration of the manner in which base 202 provides for insertion of a cup from either side of the unit. Guides 225, 226 are positioned below the conduit 221 when it is assembled. These guides are arranged to direct a cup toward the appropriate position under the conduit and prevent its uncontrolled movement. In accordance with the size of the cup used, these guides effect a stop when it is properly positioned. A typical cup 218 is shown in phantom outline in FIG. 16 as it is being advanced into the dispenser. FIG. 16 illustrates the fact that the lip of the cup may be employed to effect the necessary rotation of dispensing trough 207. As noted previously, alternatively a depending projection from the rear of the trough may be provided to engage the body of cup 218 in order to avoid touching the lip of cup 218 to the trough.

FIG. 16 also illustrates pertinent details in the construction of the container 206. A vane 224 traverses the base of the container in a longitudinal direction. The use of such a vane has been found helpful in agitating the liquid in order to prevent the settling out encountered with some beverages after storage for a period of time. Container 206 uses a single loading and unloading aperture covered by a threaded cap 222 having an aperture therein for the conduit 221. In this embodiment, conduit 221 is integrally molded with a shoulder portion 223 that is sealingly seated with cap 222 against the opening of container 206. This insures an air tight connection with the exception of the aperture in conduit 221 itself. Of course, it is possible to use other arrangements for the filling of container 206, and as already noted, it may be desired to provide valving means associated with conduit 221.

FIGS. 18 through 21 show the detailed construction of the trough 207 utilized in conjunction with the third dispenser. This trough, in addition to the basic spillproof and drip-proof features previously described, utilizes baffles to limit splashing within the trough and includes a further modification of the dispensing aperture.

Figure 18:
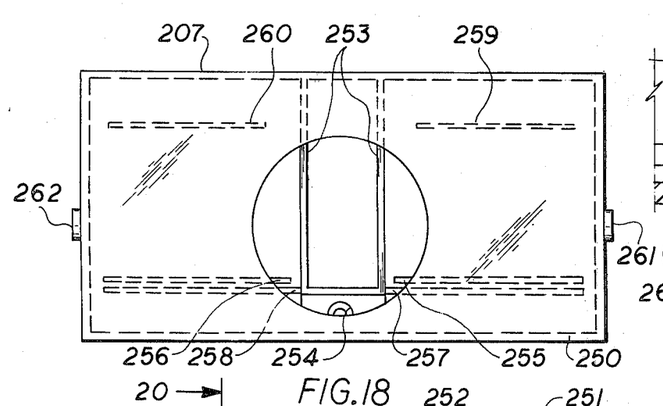
FIG. 18 is a top view of the dispensing trough used in conjunction with the third embodiment of the invention.
Figures 19, 20:
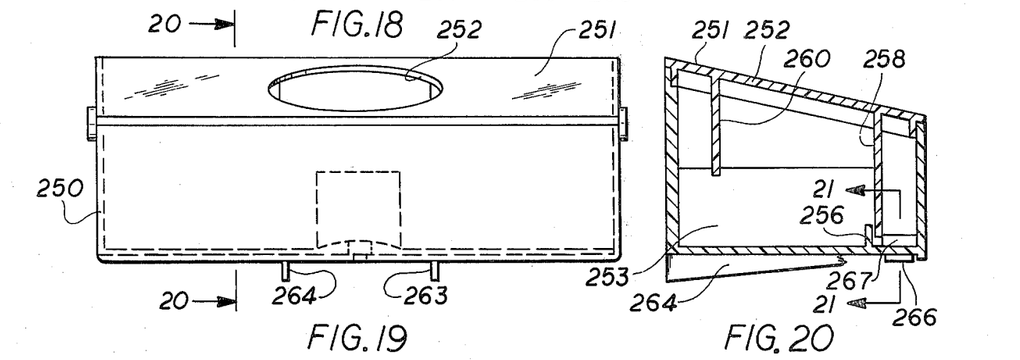
FIG. 19 is a front elevation view of the dispensing trough used in conjunction with the third embodiment of the invention.
FIG. 20 is a cross-sectional view taken along lines 20—20 of FIG. 19.

Essentially, the trough is a walled chamber 250 having the control chamber defined by walls 253. A cover 251 is nested within the walls 250 and includes opening 252 for the input conduit. FIG. 18 permits a view through opening 252, of dispensing aperture 254 and several of the baffles which prevent splashing within the trough. Near the front edge of the trough, there is provided a transverse projection upward from the floor and separating the major portion of the trough from the discharge aperture. This projection is illustrated by separate vanes 255, 256 which are visible in both FIG. 18 and FIG. 20. Cooperating baffles 257, 258 project downward from the cover 251 in a position slightly ahead of the bottom projections. The position of the baffles 257, 258 is such that they are between projections 255, 256 and dispensing aperture 254. As seen in FIG. 20, this positioning coupled with the fact that the lengths of the rojection relative to one another provide an overlap, insures that liquid will not pass from one side to the other, except through the controlled spaces. The length of the baffles is preferably limited, as illustrated, in order to provide through passage for liquid along the floor of the trough at each end. Along the major portion of the trough, liquid must pass over lower baffles 255, 256 and then under upper baffles 257, 258. At the rear of the trough, depending baffles 259, 260 project downward from the cover in order to inhibit splashing in this portion of the trough.

Figure 21:
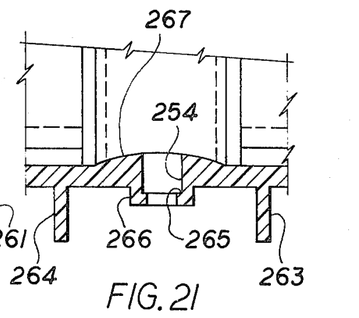
FIG. 21 is a partial cross-sectional view taken along lines 21—21 of FIG. 20.

FIGS. 20 and 21 illustrate a preferred form of dispensing aperture 254 in order to prevent dripping. In this form, the previously described inclined entry area 267 is visible. In addition, a shoulder 265 is provided near the discharage end of the aperture for holding a drip in the event that it has traversed the major part of the aperture. Finally, the aperture conduit projects below the surface of the trough as illustrated at 256 in order to prevent the possibility of liquid running along the lower surface before discharging into the cup or other receptacle used.

Figures 22, 23:
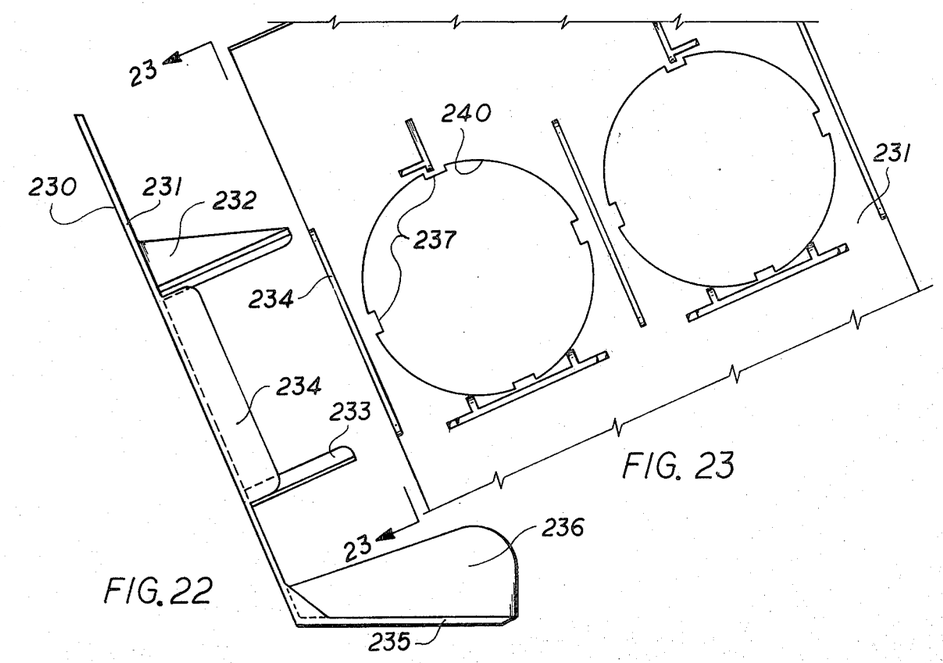
FIG. 22 is a side view of the cup dispenser suitable for use in connection with the embodiments illustrated in FIGS. 10 and 15.
FIG. 23 is a partial cross-sectional view of the cup dispenser taken along lines 23—23 of FIG. 22.

FIGS. 22 and 23 illustrate an insert 230 that may be used as a cup holder in the storage section of the previously described second and third dispensers. It will be appreciated that there is no specific need for such cup storage dispensers. On the other hand, certain applications suggest that they are advantageous. The positioning of such a dispenser is shown in the cross-sectional view of FIG. 17. Essentially, it comprises a first planar surface 231 and a second planar surface 235 disposed at an appropriate angle to match the dimension of the storage area within which it is to be installed. A number of cup securing and release projections surround apertures 240 through which the cups will be dispensed. The specific form of these projections is not to be considered limiting; however, draft angles should be borne in mind in order to insure simplicity of molding. Short extensions 237 surround the aperture 240 in order to grip the lip of the typical paper cups that would be dispensed from such a unit. Clearly, the diameter of the aperture defined by extension 237 would be slightly less than that defined by the innermost extension of the stack holding projections 232, 233.

Particular embodiments of the invention have been shown and described. Several modifications and features that may, or may not, be included, have also been presented. It will be immediately apparent to those skilled in the art, that various features of the invention may be modified without departing from the spirit and teachings therein. The specific scope of the invention is set forth by the language of the appended claims.

What I claim is:

1. A dispenser for extracting predetermined amounts of liquid from a substantially air-tight container, comprising an independent trough mounted below said container for tilting about a horizontal axis, said trough normally residing at a predetermined angle; conduit means adapted to communicate with the inside of said container below the liquid level and having an open end extending into said trough; a walled area within said trough surrounding the region into which said conduit means extends having a liquid access to the remainder of said trough below the trough walls, the level of liquid retained in said walled area at all times being sufficient to make contact with said conduit means; and a dispensing aperture outside of said region located above the lowermost internal portion of said trough when it resides at said predetermined angle.

2. A dispenser according to claim 1, wherein said walled area includes walls having a height less than those of said trough.

3. A dispenser according to claim 1, wherein said conduit means is removably attached to said container.

4. A dispenser according to claim 1, wherein said walled area is substantially less than the total area of said trough.

5. A dispenser according to claim 1, wherein said walled area includes walls having a height such that one end thereof is below the opening of said conduit means when said trough resides at said predetermined angle.

6. A dispenser according to claim 1, wherein said walled area includes walls having a height such that one end thereof is below the opening of said conduit means when said trough resides at said predetermined angle, and the opening of said conduit means also being below said aperture when said trough resides at said predetermined angle.

7. A dispenser for extracting predetermined amounts of liquid from a substantially air-tight container, comprising an independent trough mounted below said container for tilting about a horizontal axis, said trough normally residing at a predetermined angle; conduit means adapted to communicate with the inside of said container below the liquid level and having an open end extending into said trough; a walled area within said trough surrounding the region into which said conduit means extends having a liquid access to the remainder of said trough below the trough walls; and a dispensing aperture outside of said region, located above the lowermost internal portion of said trough when it resides at said predetermined angle, said trough having a substantially flat floor with a raised portion in one area, said dispensing aperture piercing said floor in the highest region of said raised area.

8. A dispenser according to claim 1, wherein the extending end of said conduit means is provided with a beveled opening such that said opening spans a finite vertical distance.

9. A dispenser according to claim 8, wherein said opening is beveled at an angle approximately 30° above the horizontal.

10. A dispenser according to claim 1, wherein the tilting axis of said trough does not include the center of gravity of the trough.

11. A dispenser according to claim 1, comprising a plurality of moldable elements, each having draft angles extending in a single direction only; a first of said elements including a compartment for receiving said air-tight container in an inverted position, a second of said elements being said trough pivotally suspended below said compartment, said second element being suspended by bearing projections seated in apertures in said first element.

12. A liquid dispenser according to claim 11, comprising a third element engaged with said first element below said compartment and said second element, and forming a base.

13. A liquid dispenser according to claim 11, including means for pivoting said container about an axis therethrough.

14. A liquid dispenser according to claim 13, wherein the axis through said container is orthogonal to the axis about which said second element pivots.

15. A liquid dispenser according to claim 13, wherein the axis through said container is parallel to the axis about which said second element pivots.

* * * * *

UNITED STATES PATENT OFFICE
CERTIFICATE OF CORRECTION

Patent No. 3,896,977            Dated July 29, 1975

Inventor(s) Thomas G. Bergstrom

It is certified that error appears in the above-identified patent and that said Letters Patent are hereby corrected as shown below:

| | | |
|---|---|---|
| Column 3, line 34 | Change "accordance" to | --according-- |
| Column 5, line 41 | Change "upwarwd" to | --upward-- |
| Column 5, line 51 | Change "throuogh" to | --through-- |
| Column 10, line 6 | Change "rojection" to | --projection-- |

Signed and Sealed this fourteenth Day of October 1975

[SEAL]

Attest:

RUTH C. MASON
Attesting Officer

C. MARSHALL DANN
Commissioner of Patents and Trademarks